Jan. 3, 1950 D. C. PEABODY 2,493,592
SELECTOR GEAR AND THROTTLE INTERLOCK
Filed Feb. 11, 1944 2 Sheets-Sheet 1
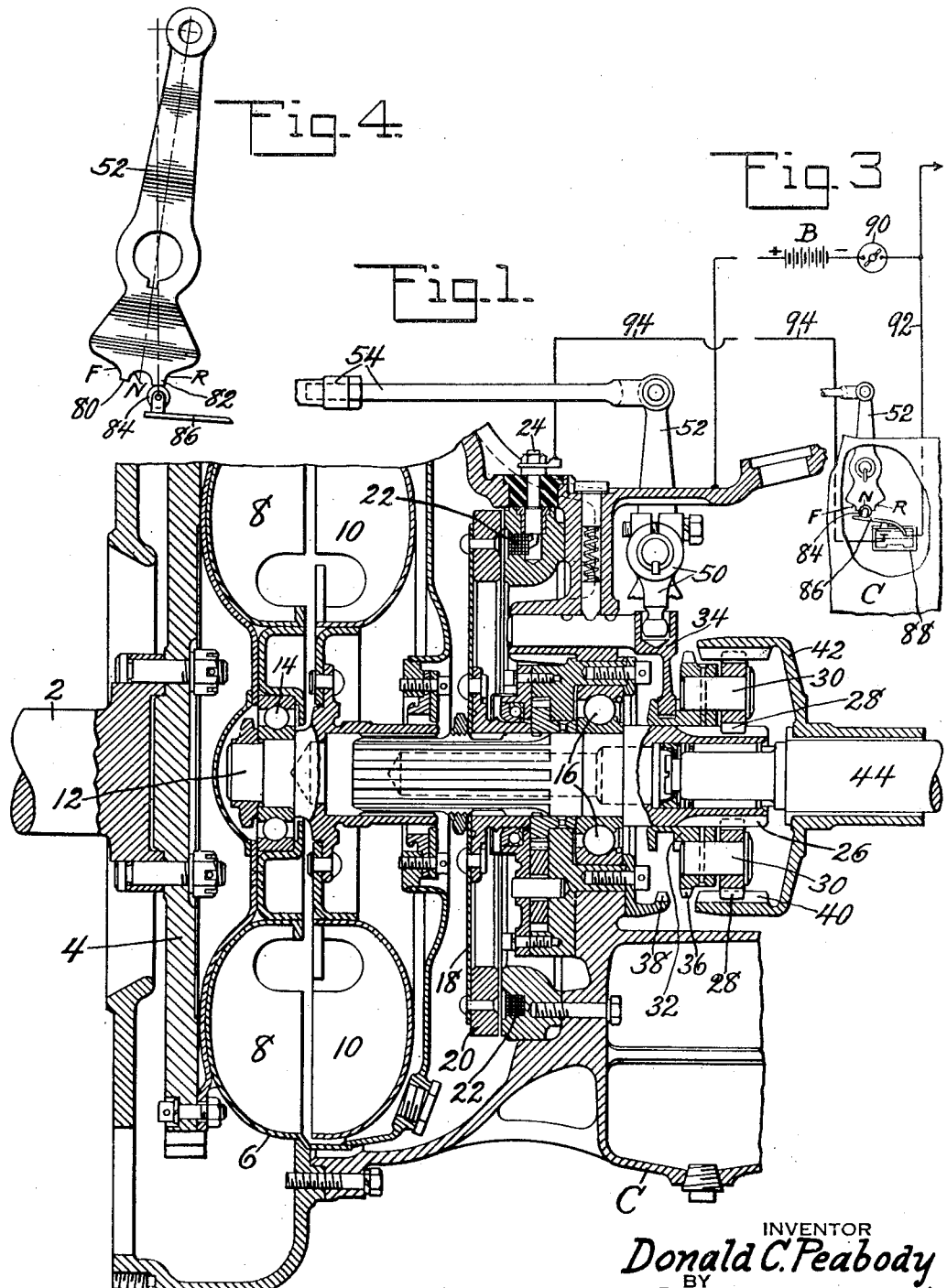
INVENTOR
Donald C. Peabody
BY
Robert A. Shields
ATTORNEY Jan. 3, 1950 D. C. PEABODY 2,493,592
SELECTOR GEAR AND THROTTLE INTERLOCK
Filed Feb. 11, 1944 2 Sheets-Sheet 2
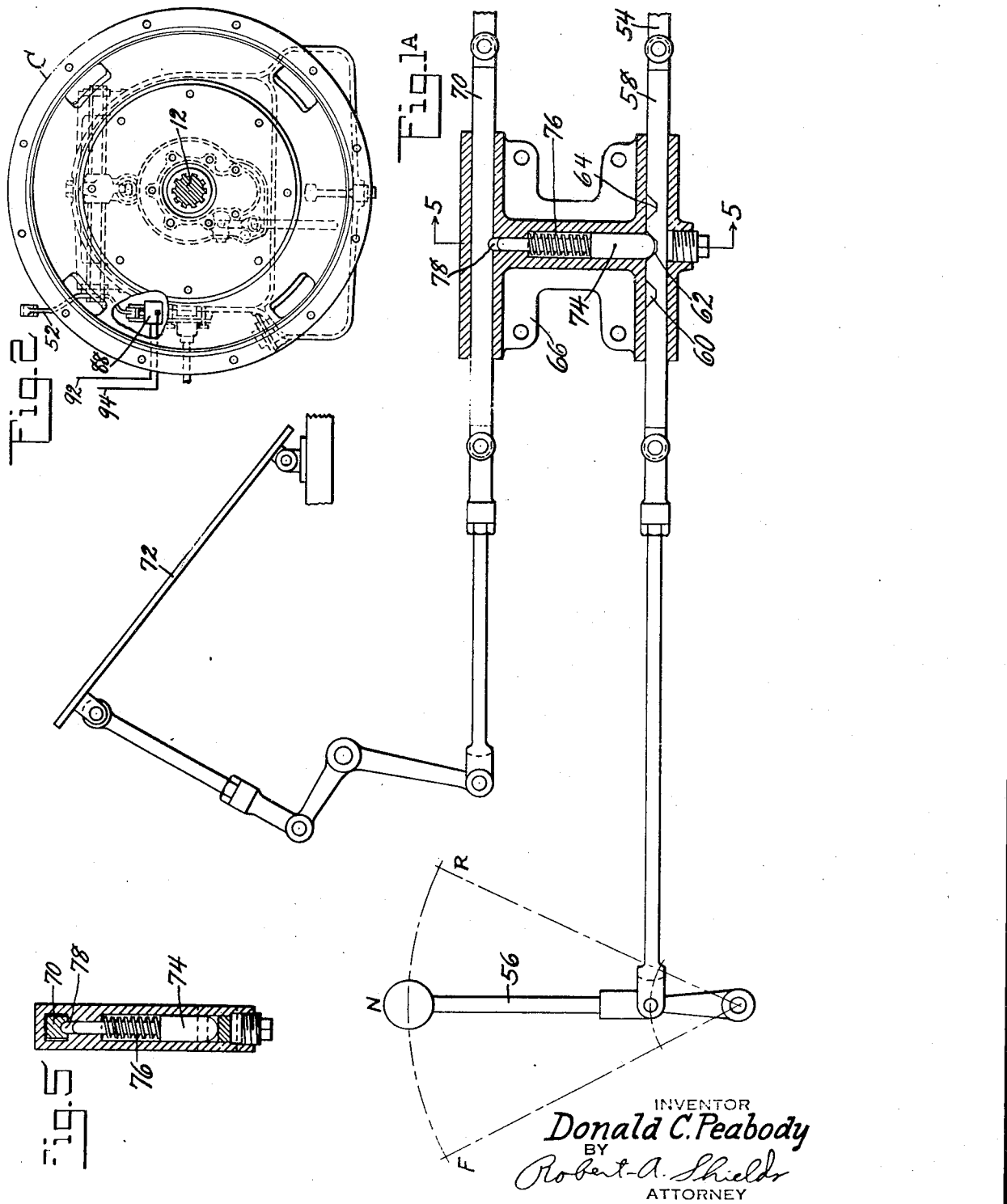
INVENTOR
Donald C. Peabody
BY
Robert A. Shields
ATTORNEY Patented Jan. 3, 1950

2,493,592

UNITED STATES PATENT OFFICE 2,493,592

SELECTOR GEAR AND THROTTLE INTERLOCK

Donald C. Peabody, Yeadon, Pa., assignor to ACF-Brill Motors Company, New York, N. Y., a corporation of Delaware Application February 11, 1944, Serial No. 521,920

7 Claims. (Cl. 74—472)

This invention relates to a gearing and throttle interlock mechanism and has particular reference to a selector gearing and prime mover throttle interlock mechanism for use with a transmission incorporating a fluid coupling.

During recent years there has been a trend towards the use of a fluid coupling for interconnecting the engine and transmission of highway vehicles. In some installations a mechanical clutch is provided in order that the impeller member of the fluid coupling may be disconnected from the engine during the shifting of selector gearing, driven by the runner member of the coupling.

In practice, however, it has been found unnecessary in most cases to provide the mechanical clutch, the impeller member then being permanently secured to the engine crankshaft. In such an installation there is a tendency for the runner to rotate at all times, such rotation also occurring when the selector gearing is in the neutral position and not transmitting any torque for driving the vehicle. When in neutral, the runner attains substantially the speed of the impeller, making the shifting of the selector gearing from neutral to a driving position dangerous unless the speed of the engine and impeller is reduced to a low level and the runner member is braked prior to gear shifting.

Various proposals have been made for applying brakes to the runner element prior to shifting, but these brakes have not been satisfactory because they permitted the operator to race the engine while simultaneously trying to brake the runner so that the gears could be shifted. It is an object, therefore, of the present invention to provide a safety means positively preventing engagement of the runner brake until the power input to the impeller is reduced to a predetermined minimum.

A further object of the invention is the provision of a mechanical interlock between the engine throttle rod and the selector gear actuating rod.

A still further object of the invention is the provision of a brake for momentarily stopping the runner of a fluid coupling prior to shifting of the selector gears.

Other objects of the invention will be apparent to persons skilled in the art from a study of the following description and accompanying drawings, in which:

Figure 1 and Figure 1A, taken together show the selector gearing and throttle interlock, the figure being partially in section and partially diagrammatic;

Figure 2 is an end view of the fluid coupling and gear housing and shows, in particular, the position of the brake actuating switch;

Figure 3 is a diagrammatic view of the electrical connections and, when taken with Figures 1 and 1A, shows substantially the entire system;

Figure 4 is an enlarged detail view showing the gear shifting arm and switch operator, and Figure 5 is a sectional view taken substantially on line 5—5 of Figure 1A and showing details of the interlock.

Referring now to the drawings in detail, it will be seen that the engine crank shaft or driving shaft 2 has coupled thereto a disc 4, which in turn carries the fluid coupling housing 6 with its impeller elements 8. Mounted within the coupling housing is runner element 10 carried by a shaft 12 rotatably mounted in the impeller element and in the gear casing by bearings 14 and 16 respectively. A brake disc 18 is splined on shaft 12 for rotation therewith and carries an armature 20. This armature may freely rotate or be held against rotation by brake magnets 22 rigidly fastened to gear casing C and supplied with electric current through a binding post 24. The rear end of fluid coupling shaft 12 is provided with gear teeth 26 adapted to mesh with planetary pinions 28 mounted for rotation on pins 30. The pins 30 are mounted in a planet carrier disc 32 which may be shifted axially relative to shaft 12 by means of a shift arm 34. The planet carrier is provided with teeth 36 which may mesh either with fixed teeth 38 carried by the gear casing C, or with orbit teeth 40 carried by orbit gear 42. This orbit gear 42 is in fact the driven shaft of the assembly shown in Fig. 1 and is the first element of the reduction gearing (not shown) and may rotate relative to a transmission shaft 44 which can properly be considered as an extension of the vehicle drive shaft. It is believed unnecessary to disclose the type of transmission or change speed mechanism connected to the driven shaft or orbit gear 42 since such gearing forms no part of the present invention. However, reference may be had to Cotal Patent 2,084,522 as showing one type of change speed mechanism which may be utilized.

The shift arm 34 for moving the planet carrier is actuated by an arm 50 non-rotatably mounted on a shaft carried by the casing C and extending outwardly through one wall of the casing. On the outer end of the shaft is keyed or otherwise fixed an operating arm 52. The upper end of this operating arm has connected thereto a gear shift rod 54 connected at its remote end to an operating handle 56 mounted in the vehicle adjacent the operator's position. The gear shift rod includes a short control section 58 provided with at least three notches 60, 62 and 64. The control section 58 is slidably mounted in an interlock housing 66. This housing also is formed with an opening to slidably receive a part 70, which is part of the linkage connecting the accelerator pedal 72 to the butterfly valve of the engine carburetor. It is, of course, obvious that instead of the foot accelerator 72 a hand throttle could be used or the linkage could be connected to other fuel control means than the butterfly valve of a carburetor. In any case the slide part 70 may be considered as controlling, through its movement, the power input to the driving shaft 2. Mounted within the interlock housing 66 is an interlock pin 74 of a length greater than the spacing between the passages in which slide the control rods 58 and 70. The interlock pin or slide bolt 74 is constantly urged by a spring 76 toward the slide rod or control 58 and will normally occupy the position shown in full lines in Figs. 1A and 5. When, however, the control rod 58 is moved the interlock pin 74 will move compressing spring 76 and projecting the other or upper end of the pin into a recess 78 formed in the power control rod 70. The recess or notch 78 is formed in the control rod 70 at such a point that the power input from the engine to shaft 2 will be reduced to a predetermined minimum, that is, the throttle or other fuel control mechanism must be returned to what is sometimes called an idling position before the interlock pin 74 can move sufficiently to permit movement of the selector gear control rod 58, thus there is but one set of conditions under which the selector gear handle 56 can be moved to engage the selector gears.

In order to control movement of the runner element 10, the selector arm 52 is formed with notches or recesses F, N and R separated by raised portions 80 and 82 (see particularly Fig. 4). These raised and recessed portions are engageable by roller 84 mounted on switch arm 86 carried in an electric switch box 88 mounted on the side of the gear casing as shown in Figs. 2 and 3. The switch parts are so arranged that when roller 84 is depressed by raised portions 80 and 82 the electrical circuit will be completed, while at all other times the electrical circuit will be open. In other words, the switch is of the normally open type which is momentarily closed by raised portions 80 and 82. Electrical energy to the magnet coils 22 is supplied from a battery B, the positive side of which is grounded and the negative side connected to the ignition switch 90. The ignition switch is in turn connected to a feeder line 92 connected to switch arm 86 of the switch box 88. Binding post 24 of the brake magnet 22 is connected by wire 94 to the open contact located in the switch box 88.

From the preceding description it will be obvious that when the engine is running ignition switch 90 will be closed, provided the engine is of the ignition type. In cases where the engine is not of the ignition type the switch 90 may be located in any essential part of the engine control system, but so located that it will be closed whenever the engine is running. Assuming that the engine has been started and warmed up with the selector gears in the neutral position as shown in full line in Fig. 1, the operator must move the throttle or power input control to an idling position, thus placing notch 78 above the upper end of lock pin 74. With the throttle control in the idling position the selector handle 56 may be moved either toward forward or reverse position, bringing the roller 84 out of notch N and into notches F or R. Before, however, the roller 84 may move into the adjacent notch it must ride over raised positions 80 or 82 and in doing so will connect wires 92 and 94, permitting current to flow from the battery through switch 90, wires 92 and 94 into the brake magnet 22. The flow of current in magnet 22 will attract armature 20 and stop rotation of coupling runner 10. With the coupling runner stopped the teeth 36 of the planet carrier may either engage fixed teeth 38 in case reverse drive is desired, or orbit teeth 40 in case forward drive is desired. It will thus be seen that, regardless of the operator's desires, the power input to the engine must be reduced to a predetermined minimum before the selector handle 56 can be moved. Also, the selector handle can not be moved to shift the selector gears without the brake being applied to stop movement of runner 10. It will thus be impossible for an operator to damage either the brake or the selector gears.

Although the construction has been described more or less in detail with specific reference to one form, it will be obvious that other forms and rearrangements of parts may be made by persons skilled in the art and all such modifications and rearrangements of parts are contemplated as will fall within the scope of the appended claims defining my invention.

What is claimed is:

1. A control system for transmission parts including a driving shaft, a driven shaft, a fluid coupling and direction change gearing connecting said shafts for forward and reverse rotation of the driven shaft, power control means for controlling the power input to said driving shaft, gear control means for shifting the gears to obtain said forward or reverse rotation of the driven shaft, and lock means including a single one piece slide bolt mechanically interlocking said power control means and gear control means by engaging notches in both said control means to positively prevent operation of but one means at a time.

2. A control system for transmission parts including a driving shaft, a driven shaft, a fluid coupling and direction change gearing connecting said shafts for forward and reverse rotation of the driven shaft, power control means for controlling the power input to said driving shaft, gear control means for shifting the gears to obtain said forward or reverse rotation of the driven shaft, and lock means mechanically interlocking said power control means and gear control means to positively prevent operation of but one means at a time, said lock means comprising a single one piece slide bolt engageable with said power control means to prevent operation thereof only after the power input to said driving shaft has been reduced to a predetermined minimum value and being biased so as to be normally out of contact with said power control means.

3. A control system for transmission parts including a driving shaft, a driven shaft, a fluid coupling and direction change gearing connecting said shafts for forward and reverse rotation of the driven shaft, power control means for controlling the power input to said driving shaft, gear control means for shifting the gears to obtain said forward or reverse rotation of the driven shaft, and lock means mechanically interlocking said power control means and gear control means to positively prevent operation of but one means at a time, said lock means comprising a single one piece slide bolt normally biased to restrain operation of said gear control means but movable thereby to prevent operation of said power control means when the latter assumes a predetermined position.

4. A control system for transmission parts including a driving shaft, a driven shaft, a fluid coupling and direction change gearing connecting said shafts for forward and reverse rotation of the driven shaft, said fluid coupling including a runner element, electro-magnetic brake means for arresting movement of said runner element, gear control means for shifting the gears to obtain said forward or reverse rotation of the driven shaft, power control means for controlling the power input to said drive shaft, means operable by said gear control means during shifting of the gears to energize said electro-magnetic brake means and arrest movement of the runner element, and additional means preventing movement of said gear control means until said power control means has been shifted into a predetermined position.

5. A control system for transmission parts including a driving shaft, a driven shaft, a fluid coupling and direction change gearing connecting said shafts for forward and reverse rotation of the driven shaft, said fluid coupling including a runner element, electro-magnetic brake means for arresting movement of said runner element, gear control means for shifting the gears to obtain said forward or reverse rotation of the driven shaft, power control means for controlling the power input to said drive shaft, means operable by said gear control means during shifting of the gears to energize said electro-magnetic brake means and arrest movement of the runner element, and additional means preventing movement of said gear control means until said power control means has been shifted into a predetermined position, said additional means comprising a one piece slide bolt directly engageable with said gear control means and power control means.

6. A control system for transmission parts including a driving shaft, a driven shaft, means connecting said driving and driven shafts and including a direction selecting device, a direction selector connected to said device, power control means regulating the power input to said driving shaft, and a mutual interlock between said direction selector and power control means permitting movement of but one at a time, said interlock comprising of a single one piece slide bolt biased to permit free movement of said power control means whenever said direction selecting device is in a preselected position and prevent movement of said power control means whenever said direction selecting device is in any other position.

7. A control system for transmission parts including, a driving shaft, an impeller element connected to said driving shaft, a runner element driven by said impeller element, brake elements one of which is connected to said runner element, a driven shaft, change gearing connecting said runner element and driven shaft, a gear control rod operatively connected to said change gearing, a power control rod for controlling the power input to said driving shaft, a housing carrying said rods for sliding movement therein, an interlock pin slidably carried in said housing and operable by either of said rods to substantially prevent movement of the other, and a switch operable during shift of said gear control rod to cause engagement of the brake elements thereby arresting movement of said runner element.

DONALD C. PEABODY.

REFERENCES CITED

The following references are of record in the file of this patent:

UNITED STATES PATENTS

| Number | Name | Date |
|---|---|---|
| 1,309,852 | Jensen | July 15, 1919 |
| 1,771,866 | Stevenson | July 29, 1930 |
| 1,780,270 | Moorhouse | Nov. 4, 1930 |
| 1,924,229 | Davis | Aug. 29, 1933 |
| 1,946,200 | Easter | Feb. 6, 1934 |
| 1,974,096 | Bartz | Sept. 18, 1934 |
| 2,163,895 | Staples | June 27, 1939 |
| 2,184,533 | Sinclair | Dec. 26, 1939 |
| 2,323,202 | Christian | June 29, 1943 |
| 2,351,485 | Conkle | June 13, 1944 |

FOREIGN PATENTS

| Number | Country | Date |
|---|---|---|
| 265,702 | Great Britain | Feb. 17, 1927 |
| 480,917 | Great Britain | Mar. 2, 1938 |